May 13, 1947.　　　　F. H. M. NEW　　　　2,420,399
THREAD DRIER HAVING RADIANT HEATERS AND AUTOMATIC CONTROL MEANS
Filed June 12, 1941　　　5 Sheets-Sheet 1

Inventor:
Francis H. M. New
By: Wilkinson, Huxley,
Byron & Knight
Attys.

May 13, 1947. F. H. M. NEW 2,420,399
THREAD DRIER HAVING RADIANT HEATERS AND AUTOMATIC CONTROL MEANS
Filed June 12, 1941 5 Sheets-Sheet 3

Inventor:
Francis H. M. New

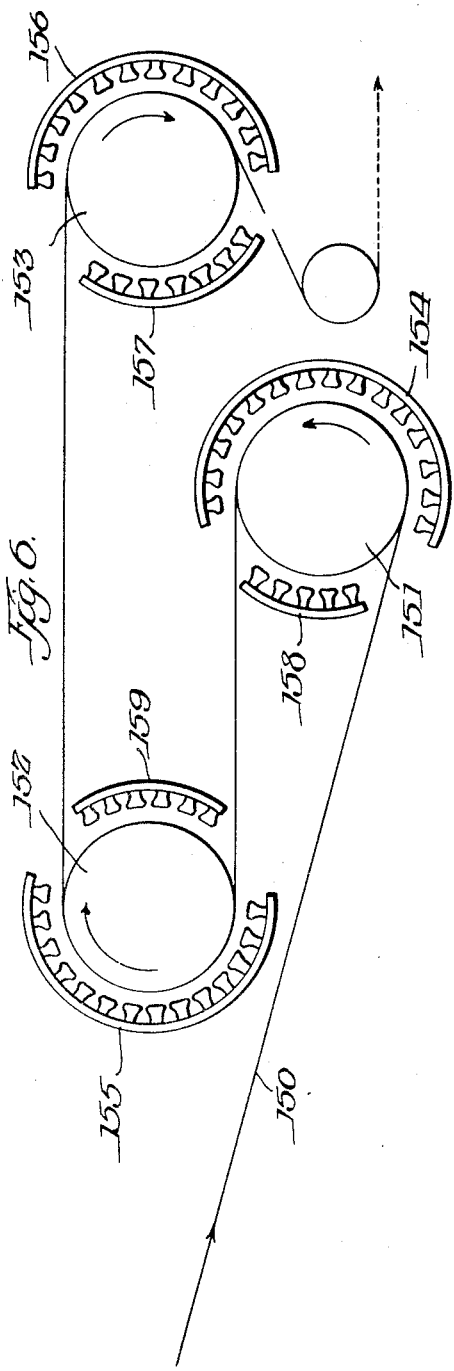
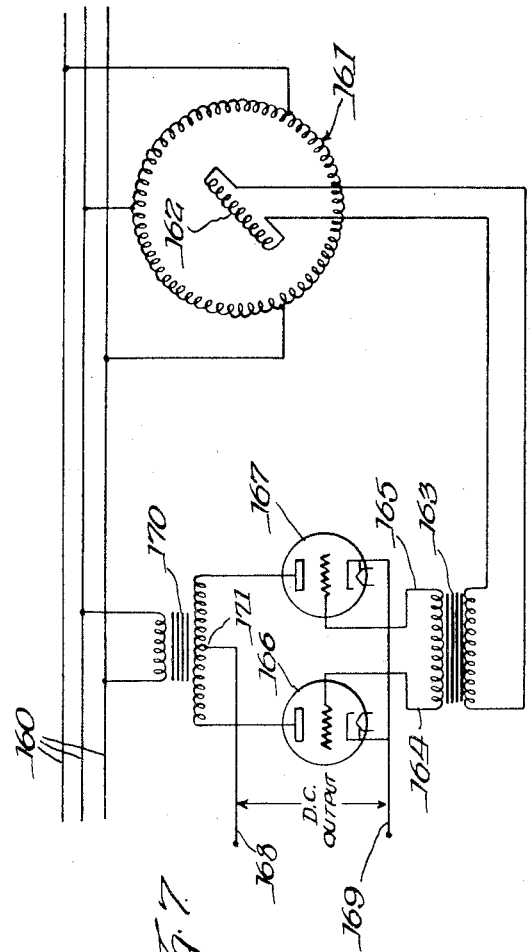

May 13, 1947. F. H. M. NEW 2,420,399
THREAD DRIER HAVING RADIANT HEATERS AND AUTOMATIC CONTROL MEANS
Filed June 12, 1941 5 Sheets-Sheet 5

INVENTOR.
Francis H. M. New,
BY
Wilkinson Huxley Byron & Knight
attys.

Patented May 13, 1947

2,420,399

UNITED STATES PATENT OFFICE 2,420,399

THREAD DRIER HAVING RADIANT HEATERS AND AUTOMATIC CONTROL MEANS

Francis H. M. New, Taylors, S. C.

Application June 12, 1941, Serial No. 397,697

11 Claims. (Cl. 34—48)

The invention relates to a method and apparatus for automatically drying to a predetermined degree of dryness and by means of radiant heat continuous materials such as filaments, threads or the like.

An object of the invention is to provide a method and apparatus for automatically and continuously drying at a predetermined rate of speed and to a predetermined degree of dryness any flexible material or substance such as a continuous filament, thread, rope or sheet by means of radiant energy. The invention contemplates that the apparatus herein described may also be used for the automatic, continuous and uniform drying of moisture laden articles fastened to or carried by conveying means, said drying or baking being accomplished automatically and to a predetermined degree of dryness regardless of the speed of movement of said articles.

Another object of the invention is to provide controlled drying or heating apparatus wherein the heat is instantaneously controlled by varying its intensity as the material or articles to be dried are passed in front of the heating units and in proportion as the speed of travel of said articles or materials is increased or decreased so that said articles or materials will emerge from said heating units in a uniformly heated and dried condition irrespective of any variations in their rate of speed of travel through the apparatus.

It is a further object of the present invention to provide for the drying of flexible materials by subjecting said materials to the infra-red rays of incandescent electric lamps or heaters and by controlling the voltage and current in the circuits supplying said lamps or heaters, whereby as the speed of travel of the material is varied the voltage to the lamp filaments may be varied by phase shifting of the alternating current, or phase shifting and rectification of the alternating current, so that the heat from the drying lamps which penetrates the material will also be varied to cause approximately uniform and even drying of the material without regard to variations in the rate of speed of travel of the material.

A further object of the invention is to provide drying apparatus of the character described which will embody one or more stages of drying in each of which the heat intensity is controlled by elongation of a member such as a rayon ribbon, having a variable length in response to the moisture in the surrounding air. In accordance with the invention the elongation of the moisture sensitive material will cause a variation of inductance or capacity or a combination of both in a tuned circuit which in turn delivers a voltage that is amplified and used to control through a bridge circuit the phase relation of the power flow to the heating units.

It has been found advantageous in practice to subject each thread of the sized warp to the same degree of heat as each other warp thread even though they may be numerous. Likewise it is necessary that each warp thread be uniformly dried from one end to the other and said drying should be accomplished with a minimum of contact with metals or other materials from which foreign substances such as fine particles of dirt, lint, color or chemical compounds or the like may be picked up and retained by said warp threads. Also it is advantageous to dry the threads which make up the sized warp uniformly throughout their diameters and with uniform tension and with a minimum of pressure of deformation by their supporting and conveying bodies in the process of drying. In addition to the foregoing it is advisable in connection with the apparatus to render the warp threads during the drying operation readily accessible by the operator so that the said threads may be easily reached without injury to the operator for the purpose of mending, piecing or examining said threads.

The old type of warp sizing machine did not completely fulfill any of the above desirable conditions. The relatively large hollow cylinders, through the interior of which live steam was circulated, comprised a bulky, expensive and wasteful apparatus as compared to the present invention. Also the old apparatus gave considerable trouble as a result of the water from the condensed steam accumulating inside the large hollow cylinders, in the supply lines and in the return drain lines. Therefore the operation and maintenance of this old apparatus was expensive, time consuming and slow. It will be readily observed by those engaged in the art that the present invention embodies many improvements over the old steam method of drying textiles or other fibers since the present apparatus is entirely free from steam condensation troubles and the heat energy for drying is conserved to the greatest possible extent. Radiant heat as used in the drying of warp threads in the type of machine herein disclosed penetrates instantaneously throughout the diameter of the yarn. Therefore the drying of the material is more rapid than by heat of conduction or of convection.

With these and other objects in view, the invention may consist of certain novel features of construction and operation, as will be more fully described and particularly pointed out in the specification, drawings and claims appended hereto.

In the drawings, which illustrate an embodiment of the invention and wherein like reference characters are used to designate like parts—

Figures 1 and 1A show in side elevation one embodiment of the improved drying apparatus of the invention as part of a slasher for processing warp threads;

Figure 6 is an elevational view showing a modification of the invention wherein the material passes over a series of revolving cylinders and is heated during said passage by means of drying lamps supported by arcuate frames conforming to the contour of the cylinders;

Figure 7 illustrates an electrical wiring diagram showing another representative control circuit which may be used in place of and for the purpose of that shown in Figure 5;

Figure 1:
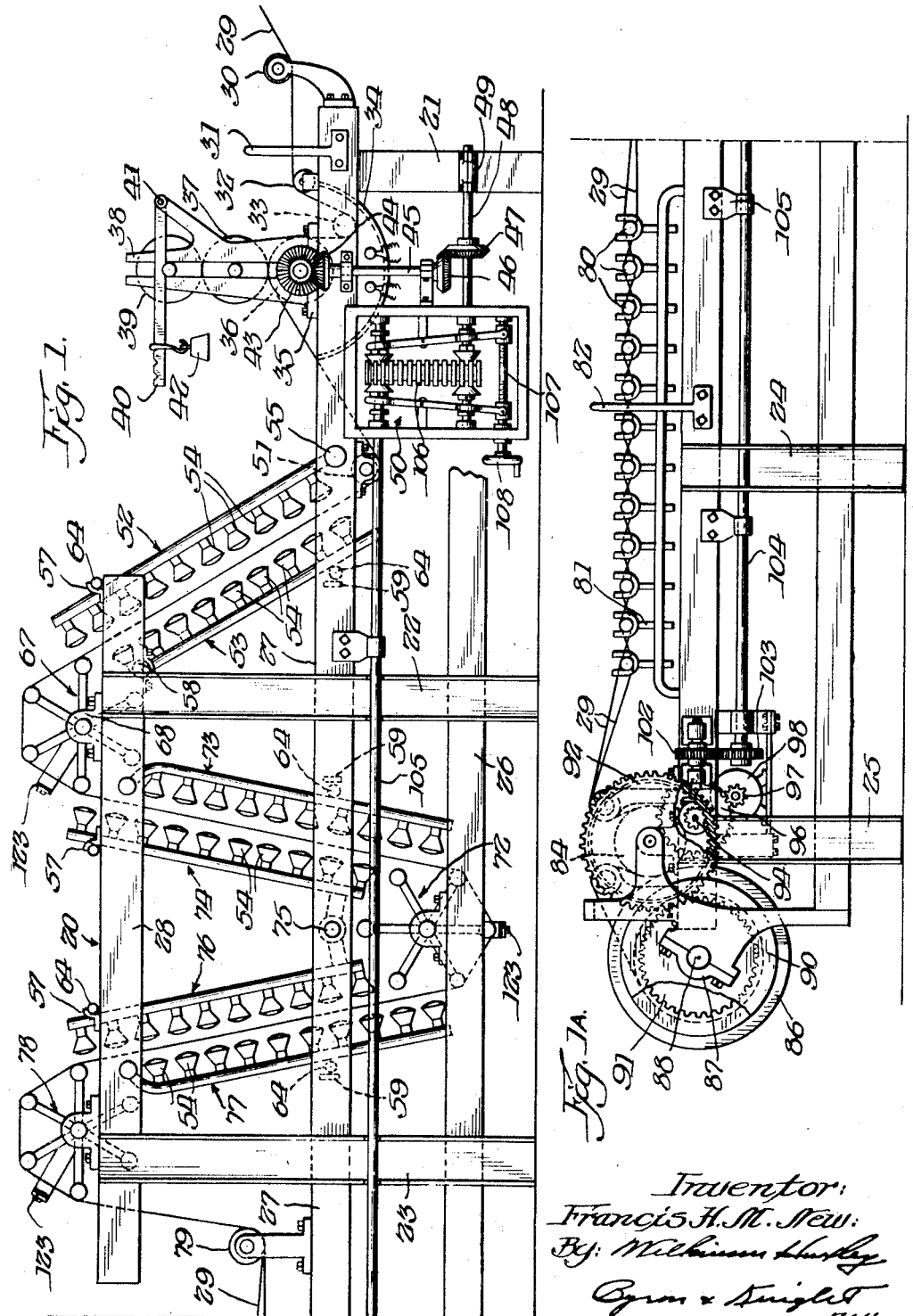

The arrangement and construction of the principal parts of the drying apparatus as incorporated in and with a warp sizing machine are best disclosed in Figures 1 and 1A in which a frame 20 fabricated of channel steel or other suitable material is used for supporting all of the parts of the machine in suitable relationship with each other. Said frame includes spaced vertically disposed uprights 21, 22, 23, 24 and 25 and longitudinally extending spaced frame members 26, 27 and 28. The uprights 22 and 23 extend above the frame members 27 and support in elevated position the longitudinal frame members 28 on which are mounted reels which pivotally support frames for drying lamps as will be more particularly described.

As seen at the right hand end of the apparatus, Figure 1, the threads 29 from several beams, not shown, are brought together at roller 30 for processing and drying by said apparatus. A comb-like piece 31, between which single or a predetermined number of threads pass, is positioned transversely across the machine frame and from said comb-like piece 31 the threads pass over a roller 32 suitably supported in desired elevated position with respect to longitudinal frame member 27. From said roller 32 the threads pass downwardly and under roller 33 located and suitably journalled within a trough 34 containing a quantity of sizing solution so that the threads or other material are immersed in said solution. Located over the pan or trough 34 and supported by bearings 35 is a roller 36. A squeeze roller 37 vertically positioned by the bifurcated supports 38 is located over and in contact with roller 36 whereby the threads 29 passing between said rollers are subjected to pressure and the surplus sizing solution is forced or squeezed therefrom. A backing up roller 39, also supported by the bifurcated supports 38, applies weight or pressure to the squeeze rollers since the same has contact with rollers 37. An arm 40 extending from the peripheral support 41 has engagement with the center shaft of roller 39 and by means of the adjustable weight 42 the pressure applied to the threads by the squeeze rollers can be varied.

The shaft of roller 36 is provided with a bevelled gear 43 which meshes with bevelled gear 44 on vertical shaft 45, which likewise has bevel gear 46 fixed to its lower end so as to mesh with a similar gear 47 on shaft 48 which is horizontally supported by bearing 49 on upright 21 and the variable drive mechanism indicated in its entirety by numeral 50. Said mechanism, which is driven by a source of power located at the other end of the apparatus, as will be presently described, operates according to the particular adjustment of the same to drive the squeeze rollers through the connections described at the proper and desired speed of rotation.

From the squeeze rollers the threads pass downwardly between the longitudinal frames 27 so as to contact and pass around an idling roller 51 journalled by bearings fixed to the undersurface of the longitudinal frame members 27. The threads then pass upwardly at an angle with respect to the horizontal between tubular frames 52 and 53 supporting a bank of drying lamps 54. Frame 52 is pivoted at 55 so as to have movement rearwardly from the inclined position shown, or in a direction toward the right away from the threads. In operative position the horizontal cross bar 64, forming part of the lamp bank frame 52, engages a stop 57 to limit further movement in a direction toward the threads. Frame 53 is constructed similar to frame 52 and likewise supports a bank of drying lamps 54 adjacent the threads but on the opposite or undersurface thereof. Said frame 53 is pivotally supported at its upper end from longitudinal frame member 28 as at 58 and the depending end of said frame is releasably held by the removable bar 59 which is located within and extends transversely of the longitudinal frames 27.

Figure 3:
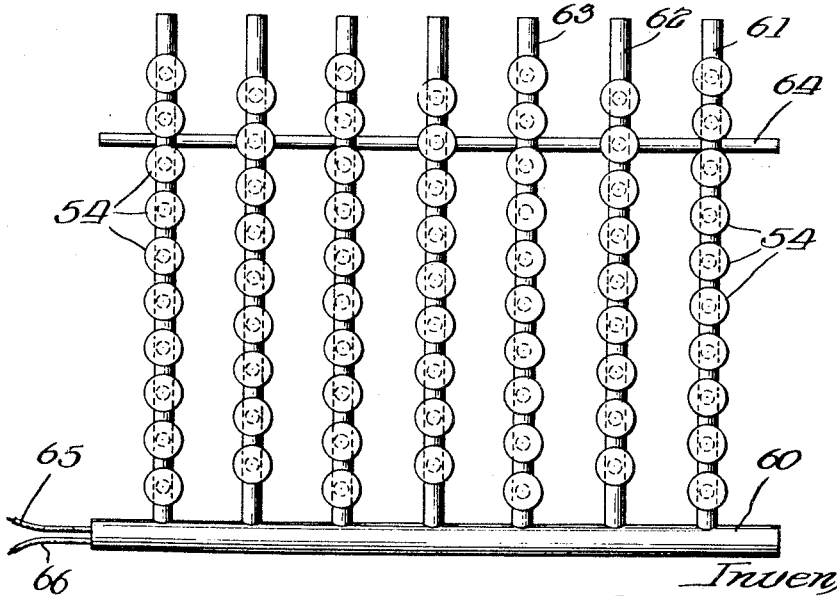
Figure 3 is a view in plan showing a drying lamp arrangement and frame for carrying the lamps and the connecting wires therefor.

The frame for the bank of drying lamps is shown in detail in Figure 3. The main tubular supporting member 60 provides the pivotal axis for the frame and extending from said member are a plurality of tubular supports 61, 62, 63, etc., which are held at their outer end by the transverse bar 64. The tubular supports retain the drying lamps 54 which are electrically connected by suitable wiring, not shown, and are supplied with electrical power through the leads 65 and 66. The leads extend through the tubular member 60 and each bank of lamps may be separately supplied with electrical power or several banks may be connected together.

Figure 4:
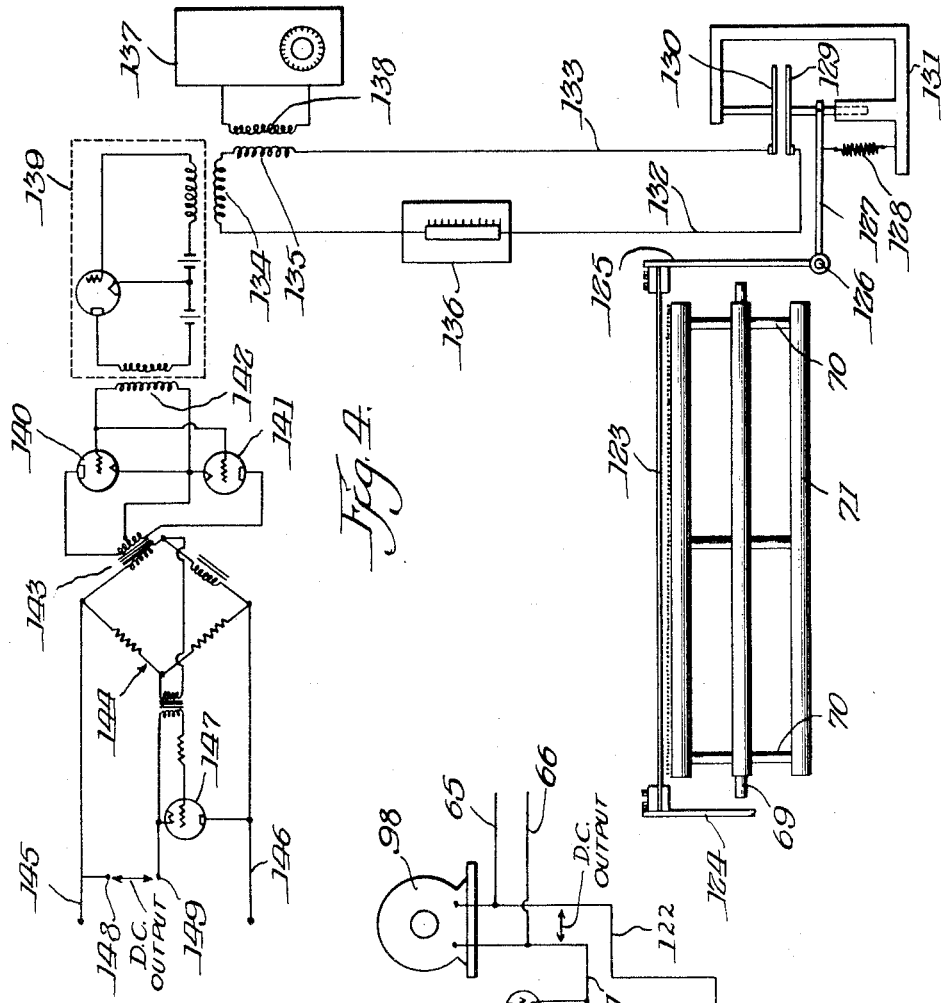
Figure 4 is a diagrammatic view showing in elevation a reel and moisture control apparatus and also showing by way of electrical diagrams the circuits for supplying electrical current in controlled amounts to the lamp drying units.

Following passage of the thread 29 or other suitable materials between the lamp frames 52 and 53 the same pass over a rotatable reel indicated by numeral 67. Said reel is suitably journalled by bearing 68 supported by longitudinal frames 28 and the reel, as best shown in Figure 4, includes a central shaft 69 having radial spokes 70 to which are secured transversely extending tubes 71. The threads engage the tubes, being spaced along the length thereof, and as a result of contact with said reel the direction of movement of the threads is reversed and the threads thereupon move downwardly to engage a similar reel indicated by numeral 72 journalled by the lower longitudinal frame members 26. During movement from reel 67 to reel 72 the threads are again subjected to a drying action produced by the heat from the lamp frames 73 and 74. Said frames are constructed in a manner similar to that shown and described in Figure 3, each frame carrying a bank of lamps 54 and having pivotal connection with the longitudinal frame members so that each lamp frame can be swung on its pivot in a direction away from the threads so that the operator may inspect or repair the threads or replace any of the drying lamps that may have burned out. Frame 73 is pivoted at its upper end and the lower end of the frame is held by the removable bar 59 while frame 74 is pivoted at 75 and the upper end of said frame is held in operative position by the fixed bracket or stop. 57.

From reel 72 the threads pass through a third set of lamp frames including frame 76 and frame 77. A third reel 78 is located at the upper end of said lamp frames 76 and 77 so that upon passage through said drying lamps the thread thereupon has contact with the transverse tubes of reel 78 which reverses the direction of movement of the threads, causing the same to thereupon travel downwardly and under the idler roller 79.

The reels 67, 72 and 78 may be power driven for high speed operation. It is also possible to replace the transverse tubes 71 with a cylinder having either a solid or a perforated surface, in which event the threads or other material passing through the drying apparatus would have contact with the periphery of the cylinders in much the same manner as the threads or material have contact and extend transversely of the tubes 71, as shown.

Figure 2:
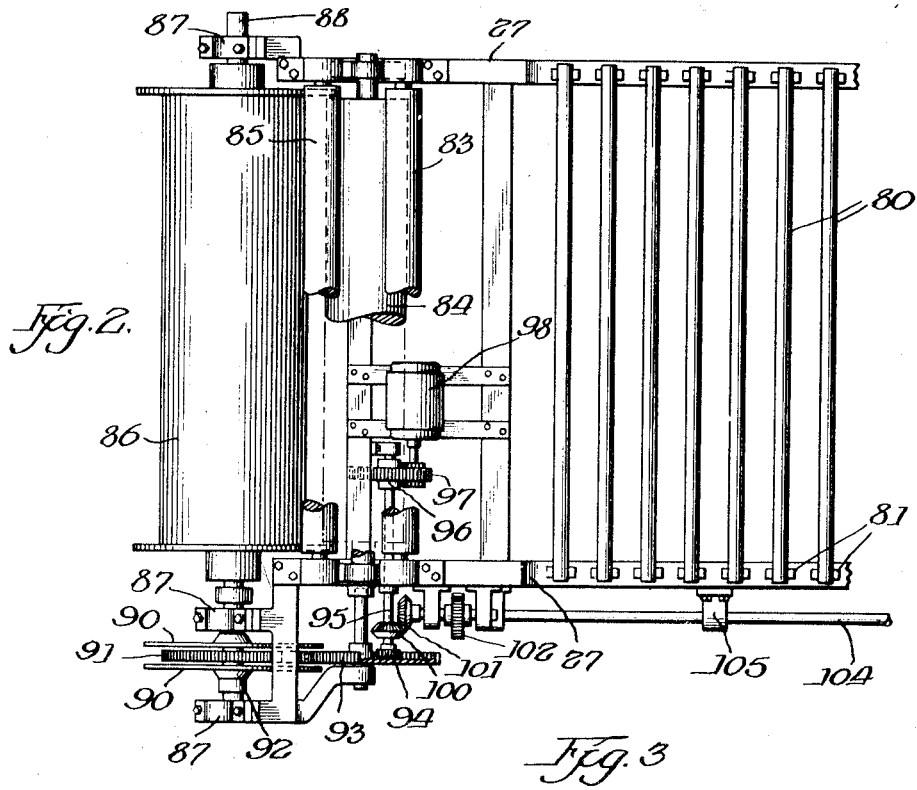
Figure 2 is a top plan view of the terminal end of the apparatus such as shown in Figure 1A.

The rear part of the present apparatus is shown in Figure 1A. It will be understood that the threads from the idler roller 79 pass to the split rods 80 which are suitably supported in the bifurcated ends of small vertically positioned standards 81. The threads pass under certain of the split rods 80 and over adjacent rods and it will also be seen that the threads are divided, certain ones passing under, whereas alternating ones pass over the same particular split rod. A comb 82 is located between said rods or the same may comprise any other form of separator for further separating the threads 29 from each other. From the split rods 80 the threads pass over an idler roller 83 journalled within the spaced longitudinal frame members 27, then under roller 84 and over a second idler roller 85, whereupon the threads are wound upon a warp beam 86. Roller 84 is in the form of an idler roller although the same may be driven if desired and it will be understood that said roller is suitably journalled as shown in Figure 2 by means supported by the side frame members 27. Bearings 87 journal the shaft 88 of the warp beam 86 and said beam is frictionally driven by friction discs 90 located on the respective sides of and yieldingly held in contact with a gear 91. Whereas the gear 91 is loosely mounted on shaft 88, the friction discs are keyed to said shaft and are held in frictional engagement with the side faces of the gear by springs or other means housed within the hub portions 92. Gear 91 is driven by gear 93 which has exterior gear teeth as well as interior teeth. Whereas the exterior teeth mesh with gear 91, the interior teeth mesh with pinion 94 on drive shaft 95 which is driven through meshing gears 96 and 97 by the electric motor 98. Said motor 98, in addition to frictionally driving the warp beam 86, also provides a source of power for rotating the squeeze rollers 36 and 37. Bevelled gear 100 on shaft 95 meshes with bevelled gear 101 which through suitable gearing 102 and 103, as shown in Figure 1A, drives the longitudinal drive shaft 104 journalled by bearings 105 and which extends longitudinally of the frame to the front end thereof where the shaft operatively connects with the speed reducing mechanism indicated in its entirety by numeral 50. Said speed reducing mechanism includes a continuous belt 106 having contact at its respective ends with adjustable cones which may be moved toward and from each other. According to the setting of the particular cones at the respective ends of the continuous belt 106 different speeds can be secured for shaft 48 for any particular speed of the longitudinal drive shaft 105. Adjustment of the variable speed mechanism is effected by shaft 107 which may be rotated to secure any particular speed ratio by the hand wheel 108.

In the operation of the apparatus thus far described it will be understood that the warp threads 29 are fed to the apparatus at the forward end thereof by the squeeze rollers 36 and 37 and that said warp threads are thereupon drawn through the apparatus for the purpose of subjecting them to a drying action by means of the frictionally driven warp beam 86. Adjustment is provided in the form of the variable speed mechanism 50 so that the speed of rotation of the squeeze rollers may conform exactly to that desired in order to subject the warp threads to the proper tension in their travel between the drying lamps. If the speed of the electric motor 98 is varied the warp beam 86 will also rotate at a different speed and likewise the squeeze rollers 36 and 37 will be rotated at a speed conforming thereto. However, in the event the tension on the warp threads is too great the speed of the squeeze rollers can be increased relative thereto merely by adjustment of the variable speed mechanism 50. It is therefore possible to place the warp threads under different degrees of stretch or tension during their travel through the apparatus.

Figure 5:
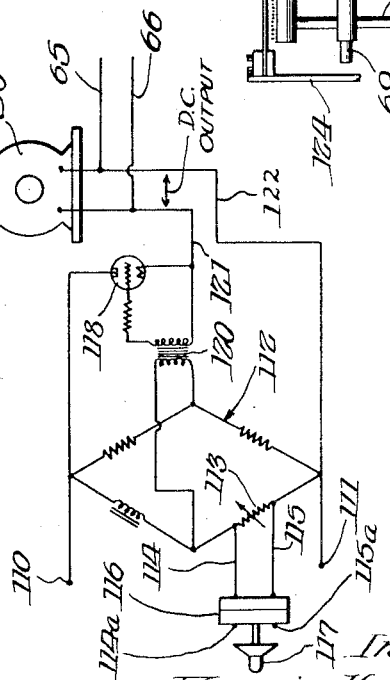
Figure 5 shows an electrical circuit embodying some of the phase changing and rectifying units as shown in Figure 4 for supplying a direct current to the motor for driving the warp sizing machine, printing machine, dyeing machine or other device to which the drying apparatus of the invention may be attached.

Figure 5 shows a wiring diagram illustrating a power control circuit whereby direct current can be supplied at controlled voltages from an alternating current source by phase control of said alternating current. Said alternating current supply is delivered to terminals 110 and 111. A bridge circuit indicated in its entirety by numeral 112 is connected across the alternating current terminals. Numeral 113 indicates variable resistance located in one branch of the bridge circuit and from the respective ends of said variable resistance leads 114 and 115 connect with a double unit variable resistance 116 similar to a radio volume control and which may have two separately enclosed units in the same housing regulated or controlled by a single knob 117. It will be understood that as knob 117 is rotated to increase or decrease the resistance of 113 the alternating current supplied to the rectifier tube 118 by transformer 120 will likewise vary and in direct proportion thereto. Accordingly a controlled direct current out-put is delivered to the motor 98 through the wires 121 and 122. The speed of the motor 98 may therefore be controlled by the operator through actuation of knob 117 and it will be understood from the structure previously described that said motor frictionally drives the warp beam 86 and also the squeeze rollers 36 and 37 to produce movement of the warp threads through the apparatus. Motor 98 is primarily used in new machines. Old machines may be converted or other mechanism may be used for controlling the speed of operation.

Figure 8:
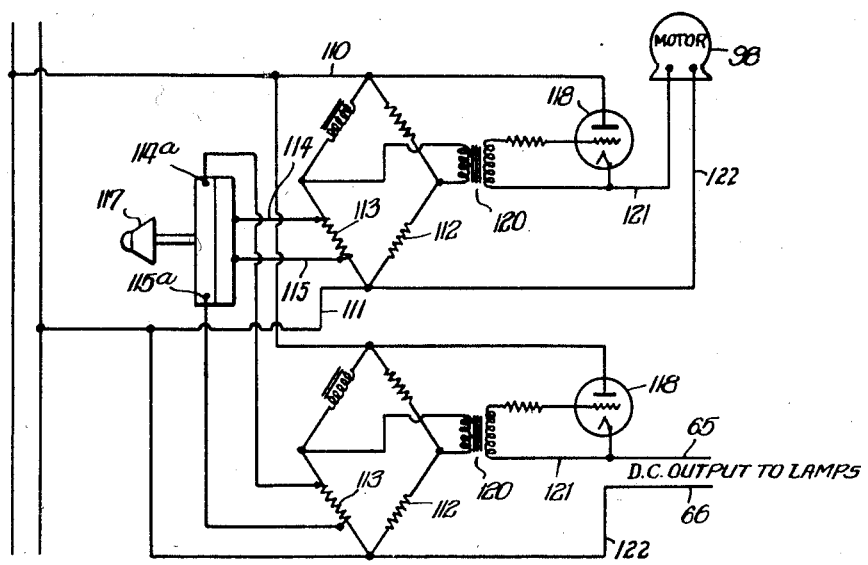
Figure 8 is an electrical circuit diagram similar to that shown in Figure 5 with the complete circuit being shown.

It is desirable to control the voltage in the lamp bank circuits of the frames 52, 53, 73, etc., so that the heating effect produced by the drying lamps will conform substantially to the speed of travel of the threads through the apparatus. As shown in Figure 5 the leads 65 and 66 for any particular lamp frame may connect directly with the direct current out-put delivered by the wires 121 and 122. However, it is also possible to duplicate the circuit such as shown in Figure 5, in which event leads 114a and 115a connecting with the second unit of the double resistance 116 are used. A complete circuit using the leads 114—115 and 114a—115a is shown in Figure 8. A direct current output is supplied to the motor 98 having connection with the conductors 121 and 122 and one or more lamp banks are separately supplied with direct current from the leads 65 and 66.

In Figure 4 automatic means are shown for controlling the lamp bank circuits in accordance with the moisture remaining in the warp threads. Located in close proximity to the reels 67, 72 and 78 are strips of moisture sensitive material such as a rayon ribbon 123 supported by uprights and clamps 124 and 125, the latter comprising a crank arm having pivotal connection at 126. The arm 127 of said crank is yieldingly held in a downward direction by spring 128 which in turn applies a constant tension to the rayon ribbon 123 or other moisture sensitive material. The free end of arm 127 beyond spring 128 supports a condenser plate 129 which has associated therewith a fixed condenser plate 130. The movable condenser plate and said fixed plate are suitable supported within frame 131 and to the back surface of each condenser plate is electrically connected a lead wire 132 and 133. Said lead wires, the condenser plates described, and the inductances 134 and 135 form a tuned circuit which may include a meter 136. Into this tuned circuit through inductance 135 an oscillator 137 feeds a high frequency current. In the tuned circuit the slightest variation in distance between the condenser plates 129 and 130 will produce a change in value of the current flowing therein.

A variable inductance may be used instead of the variable capacity as described merely by using a condenser in another part of the tuned circuit and having an inductance coil similar to 135 move to and away from an inductance coil similar to 138. With a variable inductance responding in its coupling action in response to the lengthening and shortening of the rayon ribbon or other moisture sensitive material the same variations in current flow will occur in the tuned circuit as when variable capacity is used.

Inductance coil 134 will feed power from the tuned circuit either into an auxiliary amplifier as shown enclosed in dotted lines 139, or it may, if its current flow is of sufficient strength, feed current directly into the push-pull type amplifier circuit which utilizes amplifier tubes 140 and 141, inductance 142 and which feeds its output into the primary of transformer 143, as will be clearly understood by reference to Figure 4. The transformer 143 is located in one branch of the bridge circuit 144 and is connected across the terminals of an alternating supply line indicated by numerals 145 and 146. The rectifier tube 147 is similar to that employed in the power circuit of Figure 5 with the exception that the current supplied to said rectifier tube varies in accordance with the current in-put to the bridge circuit through transformer 143. Direct current is secured from terminals 148 and 149 and said terminals may supply one or more lamp frames as desired. It will be understood that the amount of power supplied to the primary winding of transformer 143 will be in proportion to the amount of moisture contained in the warp threads 29 at the particular location of the rayon ribbon 123 which will vary in length as the moisture content of the moving warp threads may vary. Any change in the length of the rayon ribbon instantaneously results in changes of direct current voltage across the terminals 148 and 149 and thus the drying effect produced by the lamps will vary proportionately. The meter 136 may be calibrated in per cent of moisture content or it may control a recording device for making a graphic record of the moisture content of the warp threads as they travel through the apparatus. It is intended that all or any part of the drying apparatus may be wholly or partially enclosed by metal or with heat insulating material to secure more rapid drying of the threads or other continuous material for the purpose of drying the same to a degree of dryness greater than that of the room within which the apparatus may be located and for better utilization of the infra-red rays or energy radiated by the drying lamps.

In Figure 6 the warp threads or other continuous material 150 moving in the direction of the arrow are subjected to a drying action by means of heating lamps located in close proximity to revolving rollers around which the warp threads are directed. The cylinders 151, 152 and 153 may be constructed of any suitable material but said cylinders should have thin sheet metal surfaces for contacting the material to be dried. In close proximity to the cylinder surfaces and concentrically mounted with respect thereto are lamp banks 154, 155, 156, etc., which have a curvature conforming to that of the rollers. The drying action of the lamp banks may be controlled in any of the ways herein described. For example, the speed of the cylinders and the heat of drying may be controlled in relationship one to the other.

Figure 9:
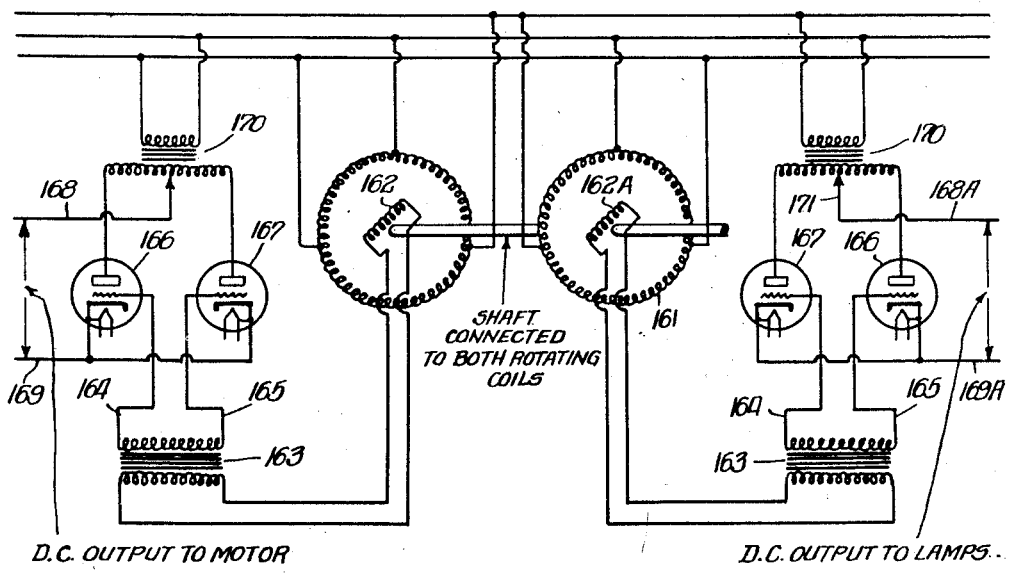
Figure 9 is an electrical circuit diagram similar to that shown in Figure 7 illustrating the modification embodying two manually operated rotors.

Figure 7 shows another representative control circuit which may be used in place of and for the purpose of that shown in Figure 5. The three-phase alternating current supply line 160 has connected therewith an inductive phase shifter indicated by numeral 161 and which phase shifter includes a manually operated rotor 162. It is possible to mount two rotors on a single shaft, one for a motor speed control circuit and the other for controlling a circuit for the voltage to the lamp banks. A complete circuit of this nature is shown in Figure 9. Basically the structure is similar to the double unit variable resistance 116 wherein one circuit including leads 114 and 115 may control the motor 98 and the other circuit including leads 114a and 115a may be used to vary the voltage to the circuit for the lamp banks. Referring again to Figure 7, the connections from the rotor winding 162 lead to a transformer 163 having leads 164 and 165 from the secondary winding thereof connecting with the grids of gas filled power rectifier tubes 166 and 167. Rectification of the controlled voltage of the power delivered at the direct current terminals 168 and 169 is accomplished by these gas filled tubes in conjunction with transformer 170 which has its primary winding connected to the alternating current supply and has its secondary winding tapped in the center at 171, which is the negative terminal of the out-put.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In drying apparatus, a longitudinally extending frame, supporting means provided thereby for supporting continuous material transversely of the frame and in a manner to permit movement of the material longitudinally thereof, a pair of squeeze rollers located at the entering end of the frame for subjecting the continuous material to pressure, a drum at the opposite end of the frame on which said continuous material is wound, power means for rotating said squeeze rollers and said drum, a plurality of drying lamps for supplying heat to said continuous material, independent supporting means for said drying lamps having pivotal connection with said frame between the squeeze rollers and said drum, and releasable means for holding each independent supporting means in operative position with the drying lamps adjacent said continuous material.

2. In drying apparatus, a longitudinally extending frame, supporting means provided thereby for supporting continuous material transversely of the frame and in a manner to permit movement of the material longitudinally thereof, a pair of squeeze rollers journalled at the entering end of said frame for subjecting the material to pressure, a drum at the opposite end of the frame on which said continuous material is wound, power means for driving said drum, means including variable speed transmission for operatively connecting said power means with the squeeze rollers whereby said squeeze rollers may be rotated at a slower speed than the drum to subject said continuous material to the desired tension, a plurality of drying lamps for supplying heat to said continuous material, independent supporting means for said drying lamps having pivotal connection with said frame intermediate the squeeze rollers and said drum, and releasable means for holding each independent supporting means in operative position with the drying lamps adjacent said continuous material.

3. Apparatus for drying warp threads and continuous material of a similar nature including an upright supporting frame, a pair of squeeze rollers at the entering end of the frame for subjecting the threads to controlled pressure, a drum at the opposite end of the frame on which the threads are wound, electric power means for rotating said drum, banks of drying lamps located between the squeeze rollers and said drum and positioned adjacent the threads for drying the same, and means for simultaneously varying the electrical energy supplied to the said power means and to said lamps.

4. Apparatus for drying warp threads and continuous material of a similar nature, in combination, a supporting frame, a pair of squeeze rollers at the entering end of the frame for subjecting the threads passing between said rollers to controlled pressure, a drum rotatably mounted by said frame at the end opposite the squeeze rollers and on which the threads are wound, power means for frictionally driving said drum, means including change speed mechanism for operatively connecting said power means with the squeeze rollers whereby said squeeze rollers may be rotated at a speed to subject the threads to the desired tension, and banks of drying lamps located between the squeeze rollers and said drum and positioned adjacent the threads for drying the same.

5. Apparatus for drying warp threads and continuous material of a similar nature, in combination, a supporting frame, a pair of squeeze rollers at the entering end of the frame for subjecting the threads passing between said rollers to controlled pressure, a drum rotatably mounted by said frame at the end opposite the squeeze rollers and on which the threads are wound, power means for frictionally driving said drum, means including change speed mechanism for operatively connecting said power means with the squeeze rollers whereby said squeeze rollers may be rotated at a speed to subject the threads to the desired tension, banks of drying lamps located between the squeeze rollers and said drum and positioned adjacent the threads for drying the same, and electrical control means for increasing the heat radiated by said drying lamps in direct proportion as the speed of movement of the threads is increased.

6. Apparatus for drying warp threads and continuous material of a similar nature, in combination, a supporting frame, a pair of squeeze rollers at the entering end of the frame for subjecting the threads passing between said rollers to controlled pressure, a drum rotatably mounted by said frame at the end opposite the squeeze rollers and on which the threads are wound, power means for frictionally driving said drum, means including change speed mechanism for operatively connecting said power means with the squeeze rollers whereby said squeeze rollers may be rotated at a speed to subject the threads to the desired tension, banks of drying lamps located between the squeeze rollers and said drum and positioned adjacent the threads for drying the same, and electrical control means for varying the heat radiated by said drying lamps in response to the moisture content of said threads.

7. Apparatus for drying warp threads and continuous material of a similar nature, in combination, a supporting frame, a pair of squeeze rollers at the entering end of the frame for subjecting the threads passing between said rollers to controlled pressure, a drum rotatably mounted by said frame at the end opposite the squeeze rollers and on which the threads are wound, power means in the form of an electric motor frictionally connecting with said drum, means including change speed mechanism for operatively connecting said power means with the squeeze rollers, whereby said squeeze rollers may be rotated at a speed different from that of the drum to subject the threads to the desired tension, a plurality of drying lamps for supplying heat to said threads, frame members supporting said drying lamps between the squeeze rollers and said drum and positioning said lamps adjacent the threads for drying the same, control means electrically connecting with certain of said lamps for varying the heat radiated by the lamps in direct proportion as the speed of movement of the threads is varied, and other electrical control means for the remaining lamps having automatic operation to vary the heat hadiated by said lamps in response to the moisture content of said threads.

8. Apparatus for drying warp threads and continuous material of a similar nature, in combination, a supporting frame, a pair of squeeze rollers at the entering end of the frame for subjecting the threads passing between said rollers to controlled pressure, a drum rotatably mounted by said frame at the end opposite the squeeze rollers and on which the threads are wound, power means in the form of an electric motor frictionally connecting with said drum, means including change speed mechanism for operatively connecting said power means with the squeeze rollers, whereby said squeeze rollers may be rotated at a speed different from that of the drum to subject the threads to the desired tension, a plurality of drying lamps for supplying heat to said threads, frame members supporting said drying lamps between the squeeze rollers and said drum and positioning said lamps adjacent the threads for drying the same, and means including moisture sensitive material for automatically controlling the electrical circuit to certain of said drying lamps whereby the heat radiated by the lamps varies in response to the moisture content of said threads.

9. Apparatus for drying warp threads and continuous material of a similar nature, in combination, a supporting frame, a pair of squeeze rollers at the entering end of the frame for subjecting the threads passing between said rollers to controlled pressure, a drum rotatably mounted by said frame at the end opposite the squeeze rollers and on which the threads are wound, power means in the form of an electric motor frictionally connecting with said drum, means including change speed mechanism for operatively connecting said power means with the squeeze rollers, whereby said squeeze rollers may be rotated at a speed different from that of the drum to subject the threads to the desired tension, a plurality of drying lamps for supplying heat to said threads, frame members supporting said drying lamps between the squeeze rollers and said drum and positioning said lamps adjacent the threads for drying the same, and means including moisture sensitive material located adjacent the path of said threads for automatically controlling the electrical circuit to the drying lamps thereof, said moisture sensitive material having variable length according to the moisture content of said threads and thereby controlling said electrical circuit by varying the voltage of the electrical current delivered thereto.

10. Apparatus for drying threads and continuous material of a similar nature including a supporting frame, a pair of rollers at the entering end of the frame between which the threads pass, a drum at the opposite end of the frame on which the threads are wound, electric power means for rotating said drum, banks of drying lamps supported on said frame and located between said rollers and said drum and positioned adjacent the threads for drying the same, and means for simultaneously varying the electrical energy supplied to the said power means and to said lamps.

11. Apparatus for drying threads and continuous material of a similar nature including a supporting frame having an entering and an exit end, a pair of rollers at the entering end between which the threads pass, a drum at the exit end of the frame on which the threads are wound, power means comprising an electric motor for rotating said drum, a plurality of electrical infra-red radiating units located between the entering and exit ends of the frame and positioned by said frame adjacent the path of travel of the threads for projecting infra-red radiations across said path, and means for regulating the radiant heat energy generated by said units in accordance with the speed of travel of the threads, said regulating means including electrical control means adapted to be adjusted manually for simultaneously varying the electrical energy supplied to the motor and to said infra-red radiating units.

FRANCIS H. M. NEW.

REFERENCES CITED

The following references are of record in the file of this patent:

UNITED STATES PATENTS

| Number | Name | Date |
|---|---|---|
| 2,038,431 | Klages | Apr. 21, 1936 |
| 1,801,065 | Ashworth | Apr. 14, 1931 |
| 2,177,541 | Stienen | Oct. 24, 1939 |
| 1,944,221 | Cook | Jan. 23, 1934 |
| 2,236,754 | Gurwick | Apr. 1, 1941 |
| 1,571,282 | Leculier | Feb. 2, 1926 |
| 1,926,292 | Kruse | May 29, 1928 |
| 1,671,493 | Staege | May 29, 1928 |
| 2,065,070 | Hanson | Dec. 22, 1936 |
| 1,143,464 | Todd | June 15, 1915 |
| 1,802,407 | Danninger | Apr. 28, 1931 |
| 1,961,012 | Platzer | May 29, 1934 |
| 2,282,070 | Mahannah | May 5, 1942 |
| 2,204,603 | Kline et al. | June 18, 1940 |
| 1,407,154 | Headson | Feb. 21, 1922 |
| 1,345,083 | Gerli et al. | June 29, 1920 |
| 2,084,189 | Bulford | June 15, 1937 |
| 2,308,239 | Bell | Jan. 12, 1943 |

FOREIGN PATENTS

| Number | Country | Date |
|---|---|---|
| 121,310 | Switzerland | July 1, 1927 |
| 356,761 | France | Oct. 17, 1905 |

OTHER REFERENCES

"Quicker Drying with Lamps," by Beggs, July 1939 issue of "Factory Management and Maintenance," pages 88 and 89.